(12) United States Patent
Osaki et al.

(10) Patent No.: US 7,213,116 B2
(45) Date of Patent: May 1, 2007

(54) METHOD AND APPARATUS FOR MIRRORING OBJECTS BETWEEN STORAGE SYSTEMS

(75) Inventors: Nobuyuki Osaki, Campbell, CA (US); Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/090,452

(22) Filed: Mar. 24, 2005

(65) Prior Publication Data

US 2006/0218365 A1  Sep. 28, 2006

(51) Int. Cl.
*G06F 12/00* (2006.01)
(52) U.S. Cl. ..................... 711/162; 711/112
(58) Field of Classification Search ............... 711/111, 711/112, 114, 165, 161, 162; 709/238, 245, 709/248
See application file for complete search history.

(56) References Cited

U.S. PATENT DOCUMENTS

| | | | |
|---|---|---|---|
| 5,535,381 A * | 7/1996 | Kopper | 710/52 |
| 6,092,066 A | 7/2000 | Ofek | |
| 6,351,792 B1 | 2/2002 | Milillo | |
| 6,473,830 B2 * | 10/2002 | Li et al. | 711/112 |
| 6,880,051 B2 | 4/2005 | Timpanaro-Perrotta | |
| 2002/0073090 A1 | 6/2002 | Kedem et al. | |
| 2003/0163553 A1 * | 8/2003 | Kitamura et al. | 709/219 |
| 2003/0177321 A1 * | 9/2003 | Watanabe | 711/161 |
| 2005/0027956 A1 * | 2/2005 | Tormasov et al. | 711/162 |
| 2005/0060506 A1 * | 3/2005 | Higaki et al. | 711/162 |

OTHER PUBLICATIONS

"ANSI T-10 Working Draft: Information Technology—SCSI Object-Based Storage Device Commands (OSD)," Rev. 09 (Feb. 19, 2004), http://www.t10.org/ftp/t10/drafts/osd/osd-09.pdf.

* cited by examiner

*Primary Examiner*—Brian R. Peugh
(74) *Attorney, Agent, or Firm*—Townsend and Townsend and Crew LLP (57) ABSTRACT

The system is disclosed in which a storage system having data, and meta-data which describes attributes of the data including its address, can copy the data to a secondary system in a more efficient manner. The storage system identifies the blocks which contain the data described in the meta-data, then reads those blocks in the order of their addresses and copies them to the desired target. The method reduces disk access time and thereby speeds copy operations.

15 Claims, 9 Drawing Sheets

| VID | OID | Pointers to data | - - - | Primary VID | Primary OID |
|------|------|------------------|-------|-------------|-------------|
| 0101 | 0100 | #1, #5, #3 |  | 0001 | 0000 |
| 0101 | 0101 | #3, #7, #6, #4 |  | 0001 | 0001 |
| 0101 | 0102 |  |  | 0001 | 0002 |
| 0101 | 0103 |  |  | 0001 | 0003 |
| 0102 | 0100 |  |  | 0002 | 0000 |
| 0102 | 0101 |  |  | 0002 | 0001 |

Figure 7

| VID | OID | Status | List of operations |
|---|---|---|---|
| 0001 | 0000 | Modified | Change attribute #n to Vn, Change attribute #m to Vm, … |
| 0001 | 0001 | Deleted | |
| 0001 | 0002 | New | |
| 0001 | 0003 | N/A | |
| 0002 | 0000 | N/A | |
| 0002 | 0001 | N/A | |

METHOD AND APPARATUS FOR MIRRORING OBJECTS BETWEEN STORAGE SYSTEMS

BACKGROUND OF THE INVENTION

This invention relates to storage systems, and in particular to techniques for improving the performance of copy operations between volumes in such storage systems.

Large organizations throughout the world now are involved in millions of transactions which include enormous amounts of text, video, graphical and audio information. This information is being categorized, stored, accessed, and transferred every day. The volume of such information continues to grow. One technique for managing such massive amounts of information is the use of storage systems. Conventional storage systems include large numbers of hard disk drives operating under various control mechanisms to record, mirror, remotely backup, and reproduce this data. The rapidly growing amount of data requires most companies to manage their data carefully with their information technology systems, and to seek high performance within such systems.

One common occurrence in the management of such data is the need to copy it from a primary system to a secondary system. Such copies are often made to provide redundancy for the data, thereby enabling retrieval of the data if events at the primary storage system preclude accessing the data, or destroy the data. Maintaining copies of the data at a remote site helps assure the owner of the data that the data will be available, even if there are natural disasters or unexpected events at the primary site. By having stored the data in a remote location, protection is also provided in the event of failures in the primary storage system. Should an event occur at the primary site, the data from the secondary site can be retrieved and replicated for use by the organization, thereby preventing data loss and precluding the need to recreate the data, at commensurate cost and delay.

Typically the data at the secondary (or remote) site is provided to that site via a communications network which is either dedicated to the transmission of data between the primary storage system and the remote storage system, via the internet, or by some other means. One method for copying the data from the primary storage to the secondary storage is to read the data at the primary site from the server connected to the primary storage, and then send that data from the server to the secondary storage. This method requires the server to handle very heavy loads for the copy operation, and causes heavy network traffic, leading to copy performance degradation.

One known method for reducing the work load on the server and/or the network is to copy data directly from the primary storage system to the secondary (or remote) storage system. In a typical implementation, a source volume (at the primary storage) needs to copied to the secondary storage. To achieve this, another volume, called a target volume is prepared in the secondary storage, and all of the data in the source volume is copied to the target volume. One problem with this approach is that even if only a small part of the volume is occupied with actual data, the entire volume needs to be copied. One solution to that issue is described in U.S. published patent application 20030163553 A1. This publication discloses a method which uses meta-data from the file system, for example an i-node table, to determine the address of the actual data to be copied. Thus, this method reduces the time required to complete the copy, because it is not necessary to copy data which are not included in the meta-data. Unfortunately, however, if the actual data is fragmented on the source disk, the scattering of the data around the disk may cause delays in copy performance due to the relatively long seek time to locate the disk read-write head at the address of the target data.

What is needed is an improved technique for copying data which overcomes the delays of the seek time for the hard disk drive head, yet copies only actual data.

BRIEF SUMMARY OF THE INVENTION

The method and apparatus of this invention provide a technique for copying data from a primary volume to a secondary volume, or between any two arbitrary volumes, in a manner enabling the copying of only the actual data itself, and in a manner which minimizes the seek times for locating the data on the hard disk drives involved.

Generally, when the primary storage system contains data, as well, as meta-data describing the attributes of that data, for example, identification information storage location, etc., the processor of the primary storage system identifies the blocks which contain the data described in the meta-data, reads those blocks in the order of their addresses, and then copies those blocks to the secondary storage system. Use of this method reduces the disk access time and the copy is completed more quickly.

In a preferred embodiment in a storage system having a primary volume and a secondary volume, a method for copying data from the primary volume to the secondary volume includes providing a table of meta-data for the data stored on the primary volume, the meta-data including at least volume identification data, object identification data, and address information data relating to the storage location where the data is stored. Then, at least some of the meta-data is copied from the primary volume to the secondary volume. When a request is made to copy data from the primary volume to the secondary volume, a list of all the storage locations associated with the data to be copied is prepared. This list of storage locations is then sorted, and the data is then copied from the primary volume to the secondary volume in accordance with the sorted list.

DETAILED DESCRIPTION OF THE INVENTION

Figure 1:
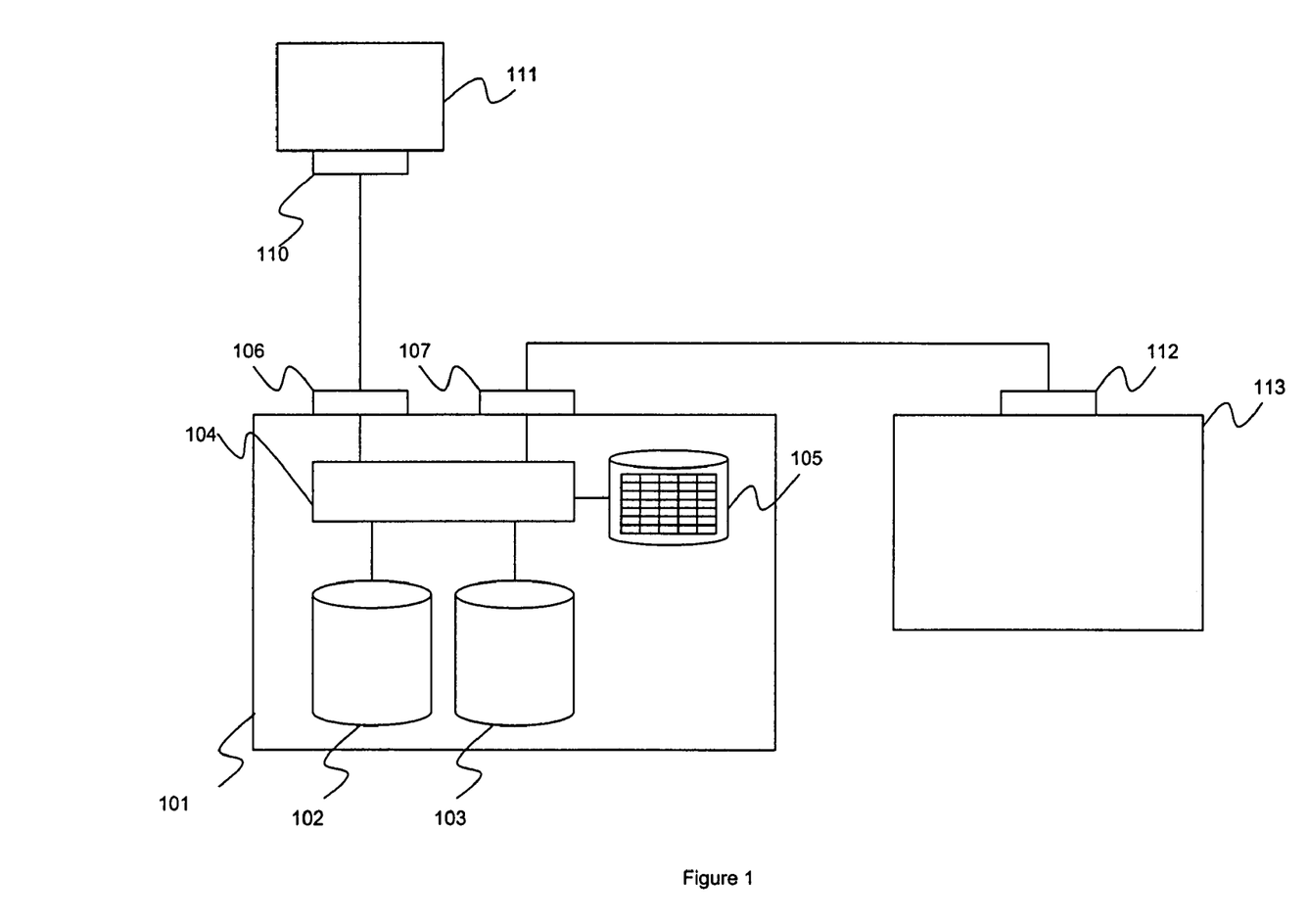
FIG. 1 is a block diagram illustrating the architecture of a storage system in which this invention may be implemented.

FIG. 1 is a block illustrating a basic system configuration for a typical storage system within which the inventions described herein may be implemented. As shown in FIG. 1, a primary storage system 101 includes local/physical volumes or partitions 102 and 103. Data is written into these volumes and read from them using a storage controller 104 operating in response to instructions from server or host 111. Host 111 communicates with the storage system 101 over an appropriate communications link, such as Fibre Channel, using interfaces 110 and 106.

In operation, storage controller 104 receives input/output requests from the server 111 via interfaces 106 and 110. In response it reads from, and writes data to, the volumes, such as volumes 102 or 103. The data which is stored in the volumes 102 and 103 is described by table 105. The data in this table is referred to herein as "meta-data," and it includes the addresses and other attributes of the data to be written or read. Meta-data 105 is shown as being maintained on its own volume, however, it may share a volume with other data, be provided using a flash memory or provided using other approaches. The storage system shown in FIG. 1 is known as an object-based storage system. If desired, it can be coupled to other storage systems 113 using suitable interfaces 107 and 112.

Figure 2:
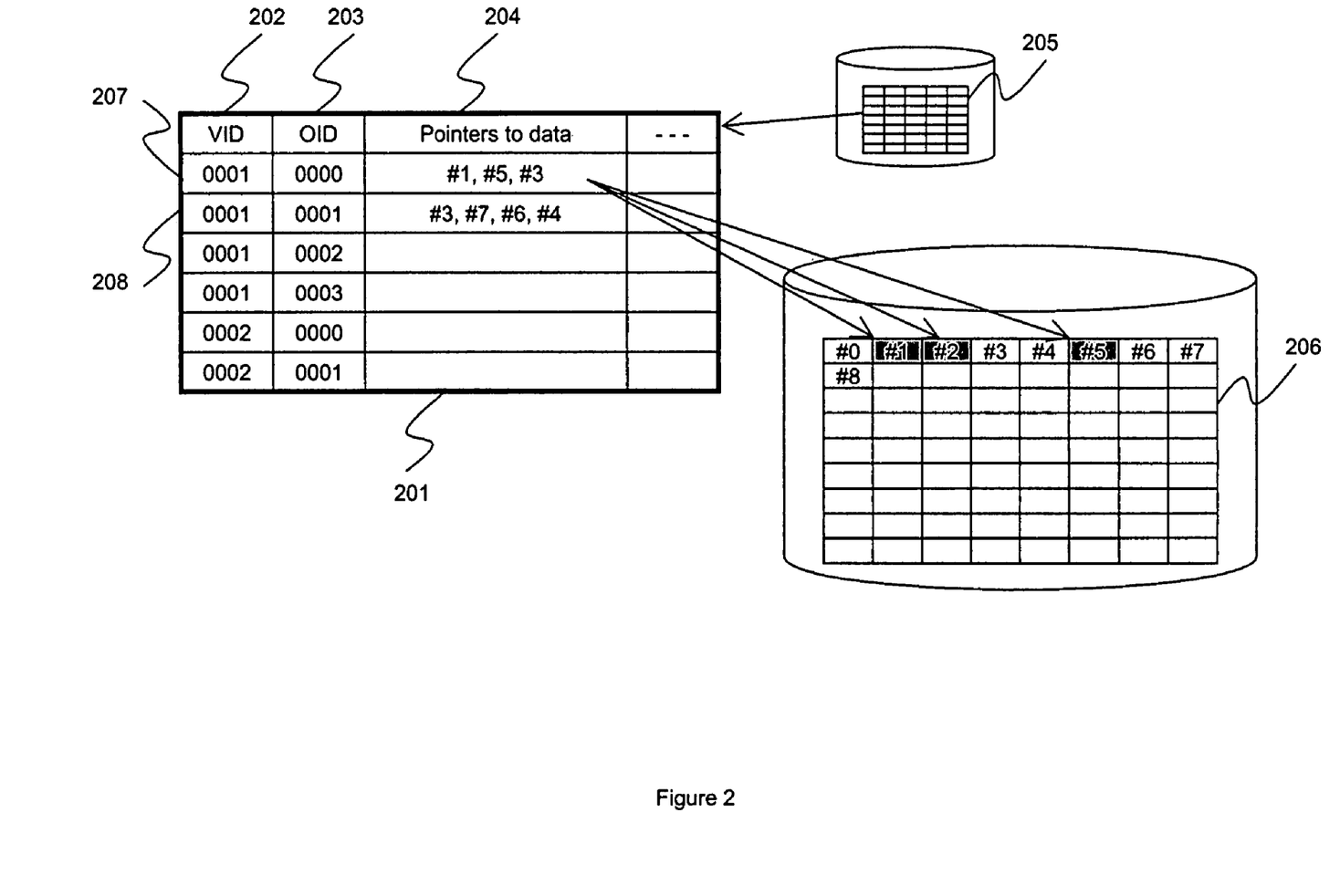
FIG. 2 illustrates meta-data.

FIG. 2 is a diagram illustrating the meta-data. In the implementation of FIG. 2 the meta-data is maintained on a storage volume of its own, although that volume may also maintain other data as well. Meta-data 201 contains information about volume (or partition) identification 202, object identification 203, and pointers to data 204. For example, as shown in row 208, object 0001 is found on volume 0001 and includes pointers to data 3, 7, 6, and 4. The pointers are pointing at the addresses where the actual data of the object is stored. The object ID will typically be unique within a volume. Of course, the meta-data may contain other attributes such as an object name, time stamp information, owner name, etc.

Figure 3:
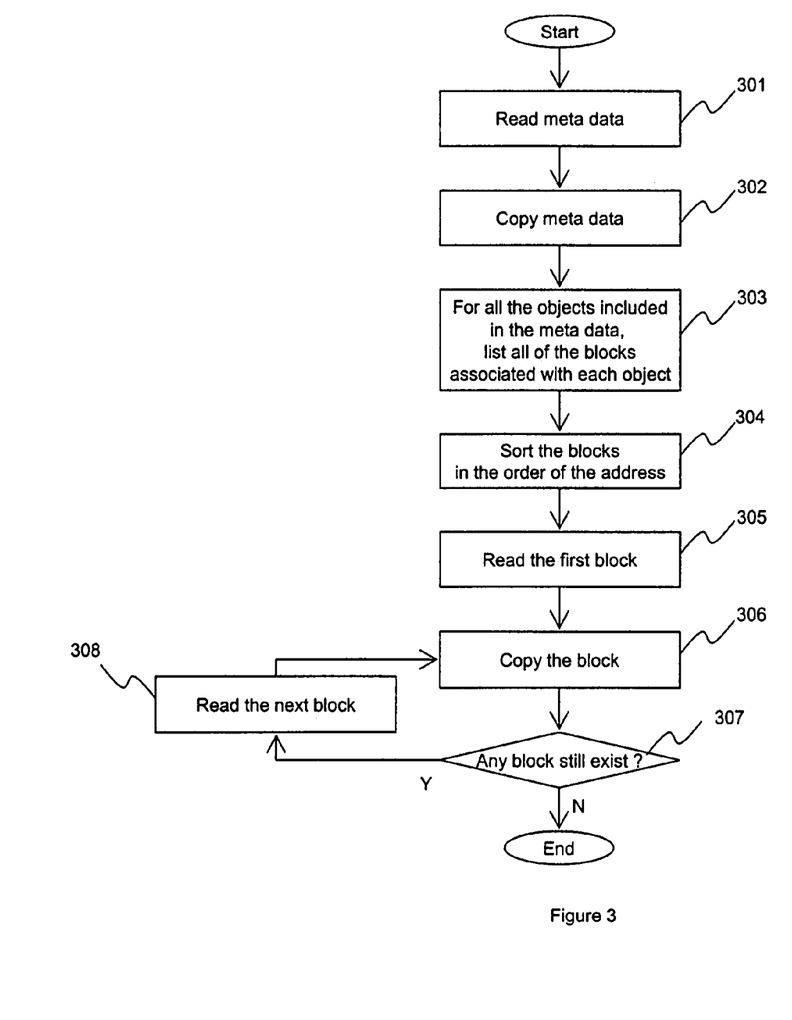
FIG. 3 is a flowchart for a volume copy operation.

FIG. 3 is a flowchart illustrating a copy operation using the meta-data. Assume that the data in volume 102 in FIG. 1 is to be copied to the secondary storage system 113. In some systems an appropriate volume is prepared in advance in the secondary storage system, and the copy technology requires this volume to be the same size and the same format as volume 102. In other systems, however, it may only be required that the volume in storage system 113 be larger in capacity than the volume 102 which provides the source data.

As shown by FIG. 3, the first action storage controller 104 does when it receives a command to copy all of the objects on volume 102 to storage system 113, is to read the meta-data, as shown by step 301. This meta-data describes the objects on the volume 102. After the meta-data is read at step 301, it is copied to the secondary storage system 113 as shown by step 302. Because the meta-data is used by the storage controllers, the meta-data needs to be available to the storage controller of the secondary storage system 113. This is particularly advantageous if the storage controller of the secondary storage system 113 uses the meta-data and operates as an object-based storage system. In addition, if the secondary storage system 113 works as an object-based storage system, object level control methods may be used to copy data blocks. Once the appropriate meta-data has been copied, the storage controller 104 determines the list of all of the data blocks associated with the objects in the material to be copied, e.g., volume 102. This step is shown in step 303 in FIG. 3. If, for example, the data to be copied is shown in FIG. 2, there are only two objects OID 0000 and OID 0001 to be copied to the secondary volume.

Once the list is complete, all of the blocks are sorted by address. Reverting to the example of FIG. 2, and assuming there are only two objects OID 0000 and OID 0001 to be copied, the addresses of the blocks containing the data for those objects are 1, 5, 2, 3, 7, 6, and 4. Once the data is sorted by address, the order of copying becomes 1, 2, 3, 4, 5, 6, and 7. By sorting the blocks in the manner of step 304, the information is placed in the most convenient order for reading and writing the hard disk, in the sense of minimizing seek times. Thus, after sorting, the list becomes 1, 2, 3, 4, 5, 6, and 7. The storage controller 104 then reads 305 the data contained in the first sorted block and copies 306 that data to a secondary storage system. The operation continues with the second block, then the third, etc. The method for copying blocks is described in detail below. As shown by FIG. 3, as long as blocks still exist to be copied, the program cycles through the last few steps of FIG. 3 until all blocks are copied.

Figure 4:
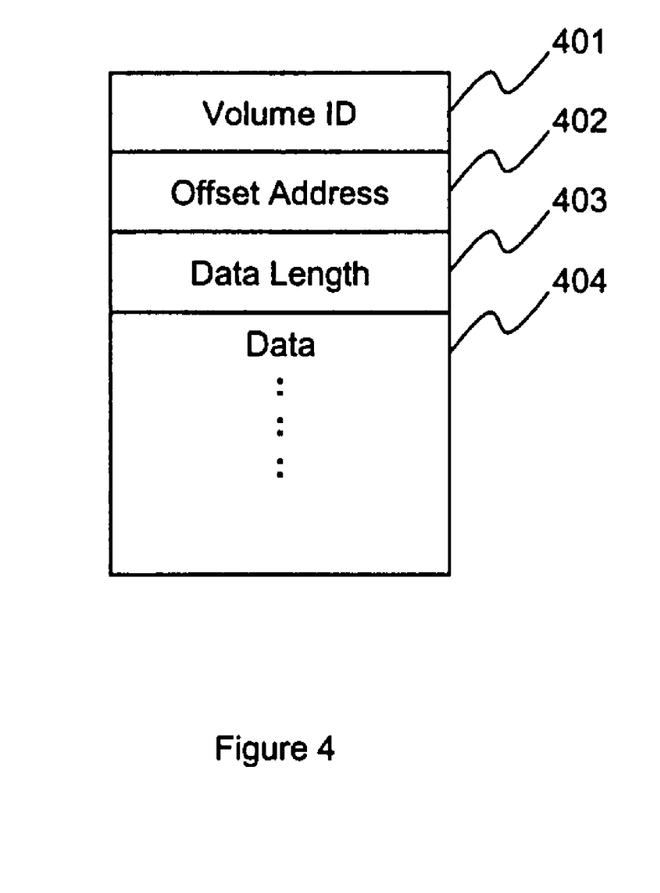
FIG. 4 is an example of a data structure used for block level copy commands.

There are two preferred methods to copy a block—block level copy and object level copy. Herein, block level copy refers to a block at a certain logical block address (LBA) being copied to exactly the same LBA but in the volume in the secondary storage system 113. FIG. 4 is a simplified example of the data structure of the data to be copied. This is a typical structure as used in block level copy commands such as just described. The data structure includes a volume ID 401 which specifies which volume in the secondary storage system 113 is the target for the data copy. An offset address 402 is specified to provide the LBA of the data in the volume 102 which is being copied to system 113. The data to be transferred and an indication of the amount of data are contained in fields 403 and 404. Note that FIG. 4 does not include the data ID or name of the peer of the communication, i.e. the secondary storage system 113 in this example, because it is assumed this information has been used to establish the connection between the two storage systems, but of course such information can be provided if desired. In an alternative embodiment, instead of using a copy command such as described, the storage controller 104 may use a SCSI standard command, for example ECOPY or WRITE as defined by the American National Standard for Information Technology (ANSI).

Figure 5:
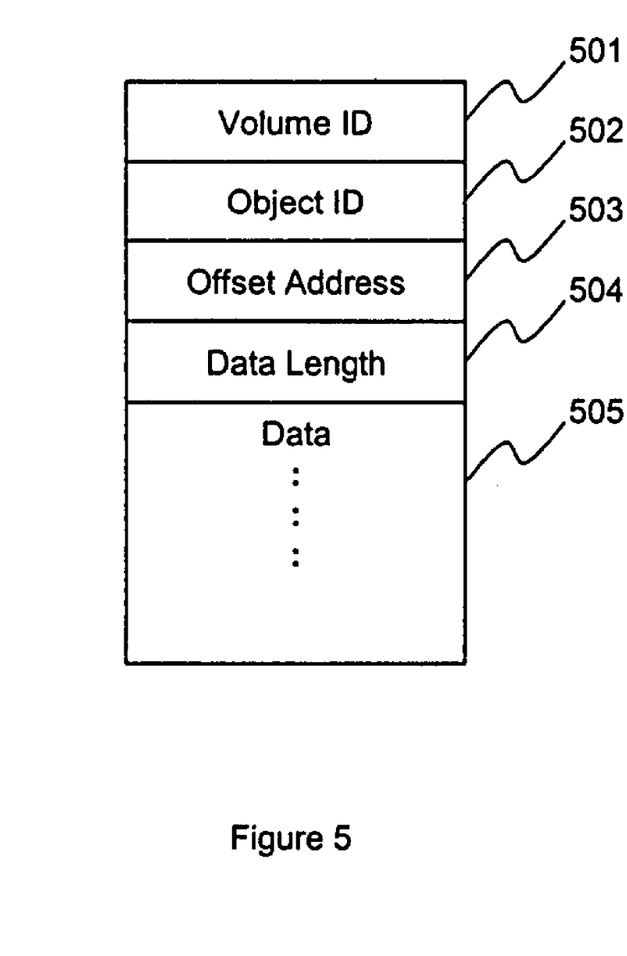
FIG. 5 is an example of a data structure used for object level copy commands.

In contrast to block level copy, object level copy uses a relative address for each object, not an address relative to a volume or partition. Object level copy is available when the secondary storage system 113 is also object-based. FIG. 5 illustrates the data structure of data as typically associated with an object level copy command. The data structure includes a record 501 specifying the volume ID or the partition ID to which the object is to be transferred. Record 502 specifies the ID of the object, while record 503 is the offset address, preferably measured from the start of the data of the object. Records 504 and 505 specify the data length and include the data to be copied to the secondary storage system 113. In a manner similar to the block level copy, the object copy command can use a SCSI object-based command such as WRITE or CREATE AND WRITE.

Figure 6:
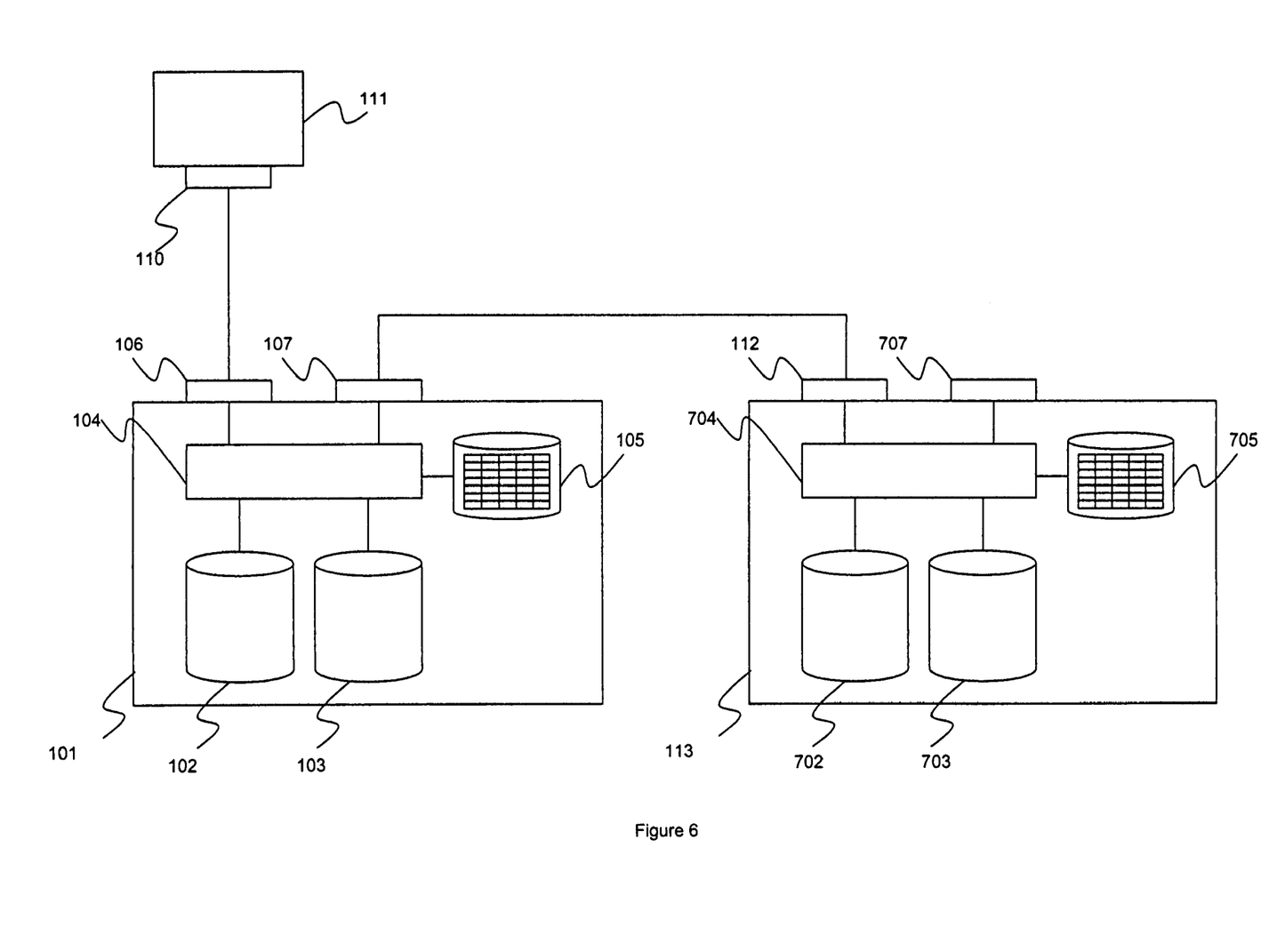
FIG. 6 is a block diagram of another implementation of a storage system.

FIG. 6 is a block diagram illustrating a system in which the secondary storage system is also an object-based storage system. As depicted, secondary storage system 113 includes meta-data 705 for volumes 702 and 703. In a typical example, the data on volume 102 will be copied to the volume 702. When the storage controller 704 receives the WRITE command, the storage controller 704 decides how to allocate the data and to which blocks. It will not necessarily store the data at the same LBA as the LBA of the primary storage system 101. Once the controller decides how to allocate the data, the address is written in the meta-data 705 which has been received from the primary storage system, for example, at step 302 (see FIG. 3). This means that pointers to the data field 204 do not necessarily have to be transferred from the primary storage system 101 to the secondary storage system 113.

Figure 7:
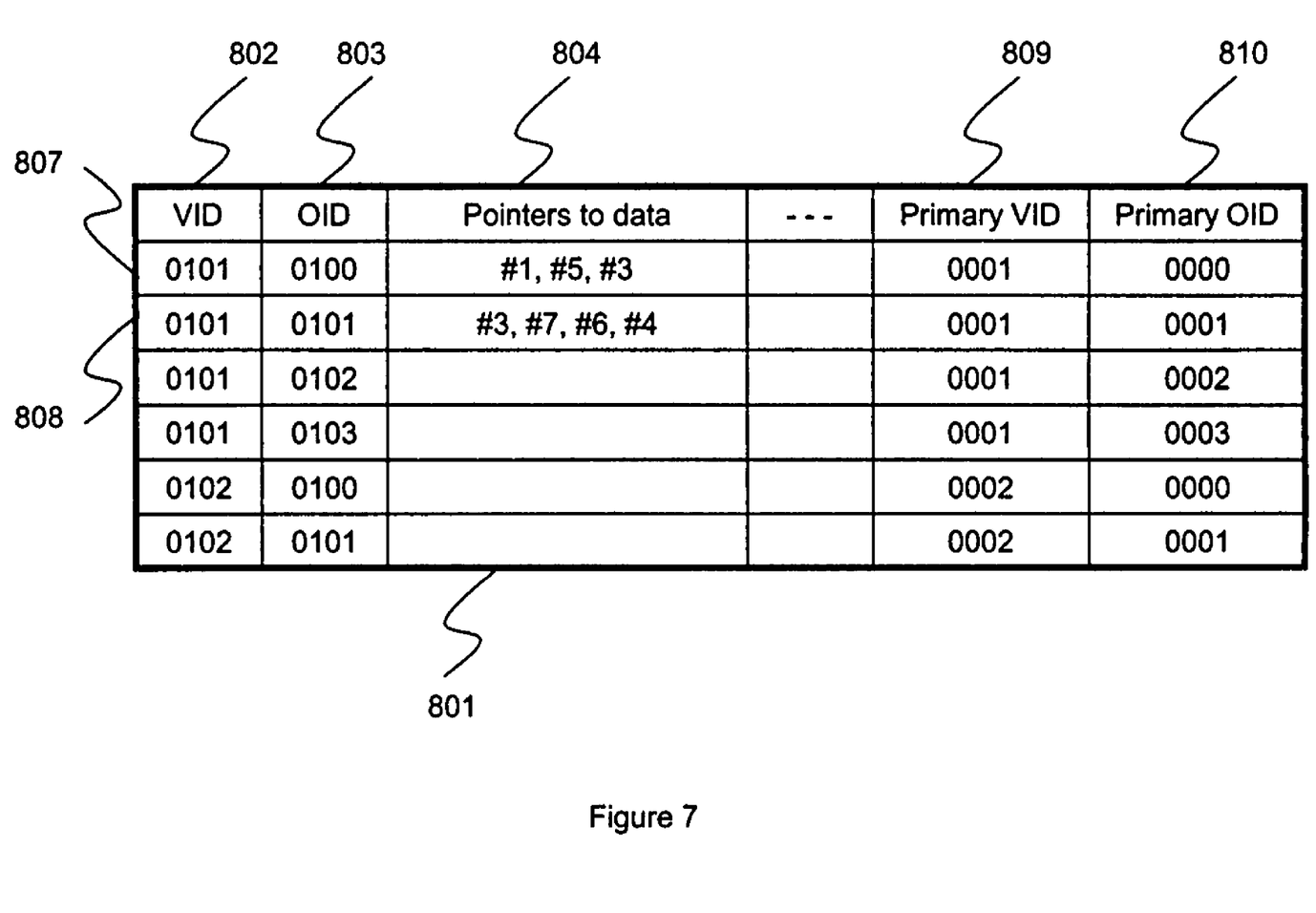
FIG. 7 is a diagram illustrating the relationships among volume IDs and object IDs.

Preferably the volume ID and the object ID will not change as a result of the data transfer. If they change, however, the relationship between the volume IDs and object IDs for the same data is described in the meta-data table 705 in the secondary storage system 113. FIG. 7 provides an example. As shown there, for example, in row 807, the object identified with volume 101 and object 100 used to have 0001 as a volume ID and 0000 as an object ID in the primary storage system 101.

The operation of the invention in various applications is discussed next. In the first example, differential copy is desired where a block level operation is used to copy data from primary storage system to secondary storage system. In such a circumstance after copying the data from the primary storage system 101 to the secondary storage system 113, if the data on the primary system is updated, there will be a difference between the two volumes. To synchronize the volume in the secondary storage system 113 with the primary volume 102, a bit map can be used to record the addresses of the updated blocks in volume 102 and to send only the updated (changed) blocks of data to the secondary storage system 113.

If data can be updated at both the primary storage system 101 and the secondary storage system 113 (for example, by a host coupled to the secondary storage system) the situation is more complex. The data in the secondary storage system may or may not be synchronized with that in the primary system after a certain period. Synchronization can be achieved by having the storage controller of both the primary and the secondary system maintain a bit map which tracks changes to that volume. When data in the secondary system is synchronized with data in the primary system, the two bit maps are merged and the blocks specified on the merge bit map are transferred from the primary storage system to the secondary storage system (A typical bit map is described in U.S. Patent U.S. Pat. No. 6,092,066.)

Another application of the invention is for object level operations, in a first case where data is updated only at the primary system. In this case if the initial copy is done with an object copy operation, the copied object in the secondary storage system 113 may have a different address than the source object in the primary system 101. In such a circumstance a bit map cannot be used directly. Instead of maintaining bit maps, a table such as depicted in FIG. 7 may be maintained for object level operations. In this case the status field 904 specifies if the object has been newly created, modified or deleted since the last synchronization. If the object already existed at the previous synchronization and has no modification since then, then "not applicable" is specified. The operations field 905 stores the changes of the attributes of the object in the order of their occurrence. Examples of attributes are the name of the object, a time stamp, etc. When the storage controller 104 receives a command to synchronize the secondary storage system 113, controller 104 prepares the commands using the table 901 shown in FIG. 8.

Figure 9:
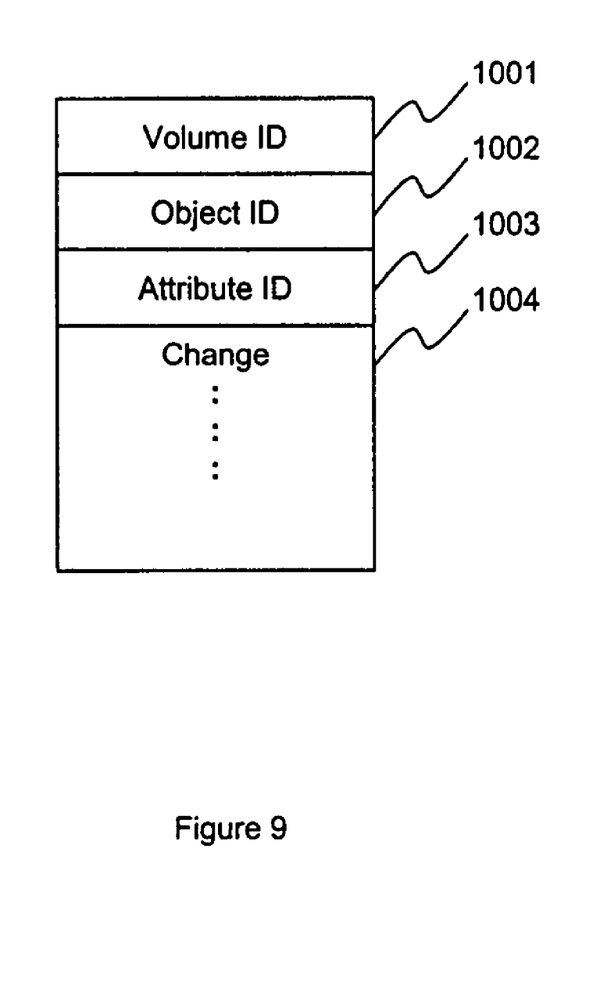
FIG. 9 illustrates an exemplary command format.
Figure 10:
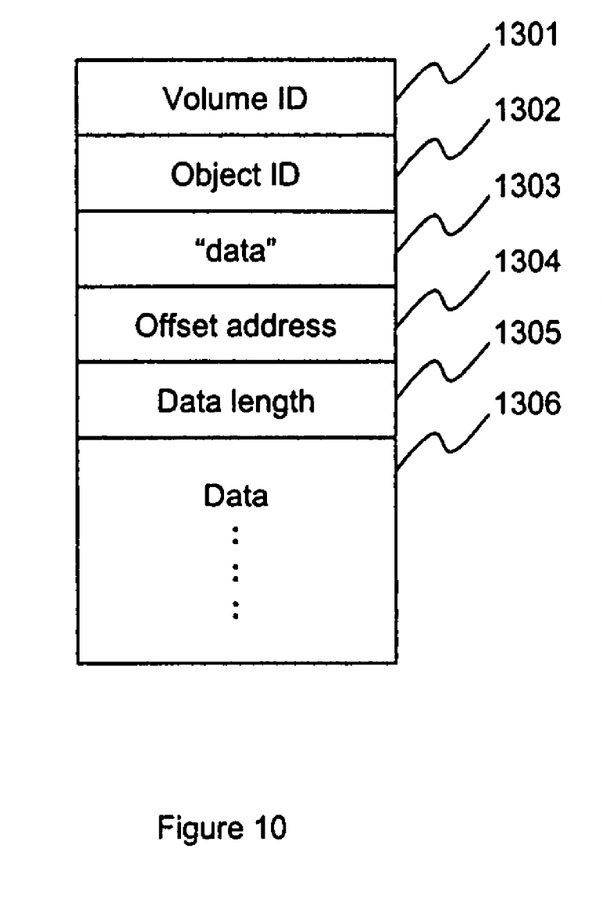
FIG. 10 illustrates another command format.

When an object is updated after the last synchronization, a list of commands to change the attributes of the object is listed in the table 901 in the order of occurrence. These commands are transferred to the secondary storage system. FIGS. 9 and 10 illustrate examples of the command format based on the table 901. For example, if the attribute "object name" has been changed, the attribute ID field 1003 will be filled with the "object name" (or a number representing it) and the change field 1004 will be filled with a new name for the attribute. In another example, consider updating just part of the data. In this case the command format such as FIG. 10 is employed. The length of the changed data is set in field 1305 and the change data itself is placed in field 1306. Storage controller 104 can then issue these prepared commands to the secondary storage system 113.

Figure 8:
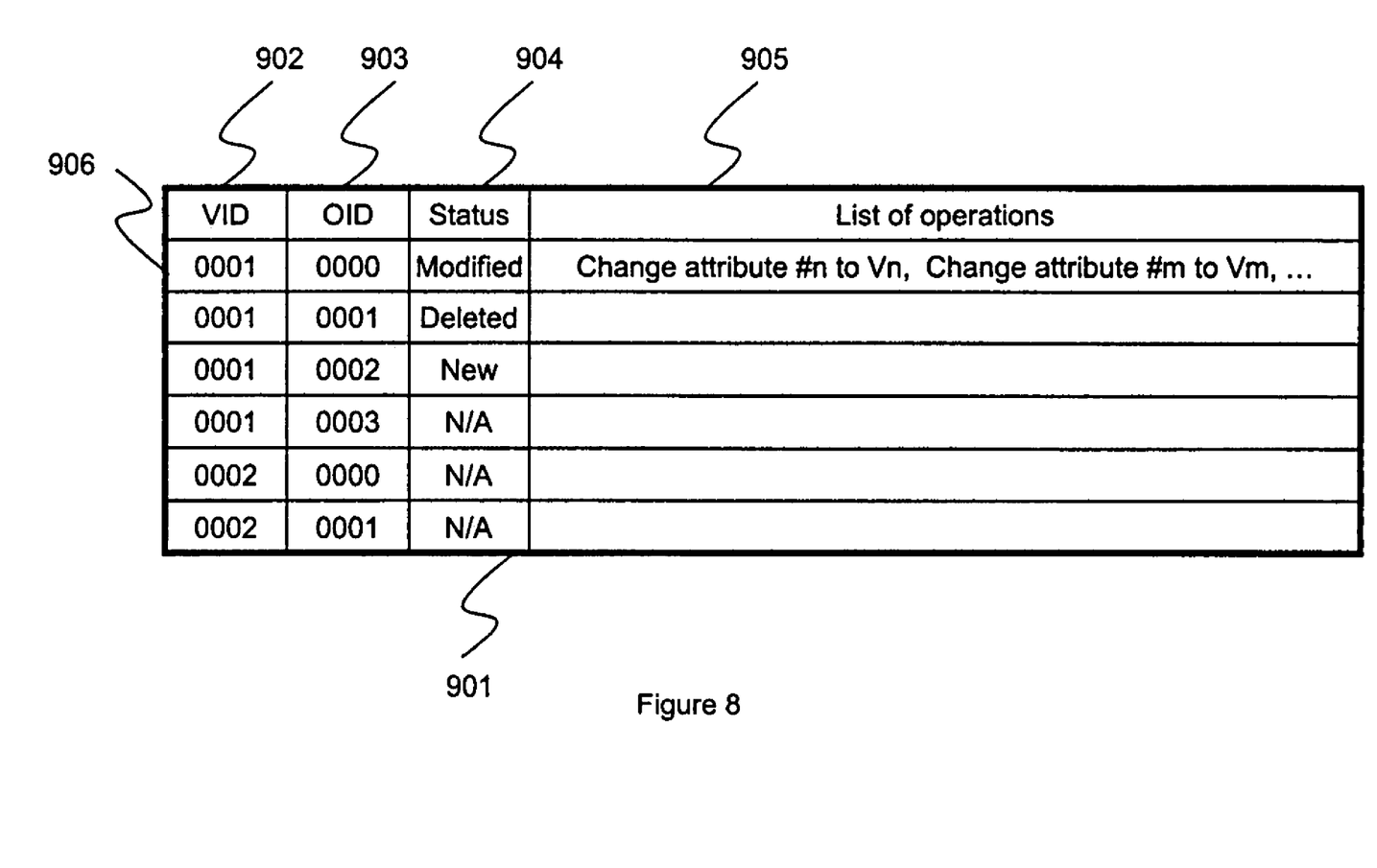
FIG. 8 is a table illustrating synchronization commands.

The commands to synchronize data do not need to be prepared and issued on an object by object basis. If the data is read in the order of the address, as specified earlier herein, the read performance can be improved. To achieve this, the updated blocks are collected based on the information in table 901 and those blocks are sorted in the order of the address using the meta-data 705 which describes the addresses of the blocks. Storage controller 104 can read this data according to the sorted order and prepare commands to copy the updated data form the primary system to the secondary system.

When an object has been newly created, a command to add an entry to the meta-data 705 is issued with the information of volume ID and object ID to the secondary storage system. Then the attributes of the object are transferred to the secondary system 113 via commands formatted as depicted in FIG. 9. If an object is deleted, a command to delete the object is transferred to the secondary storage system and the system deletes the entry from the meta-data 705, and may delete the data for that object then, or just mark that portion of the disk available for reuse. Once the synchronization has been completed, table 901 is updated.

Figure 11:
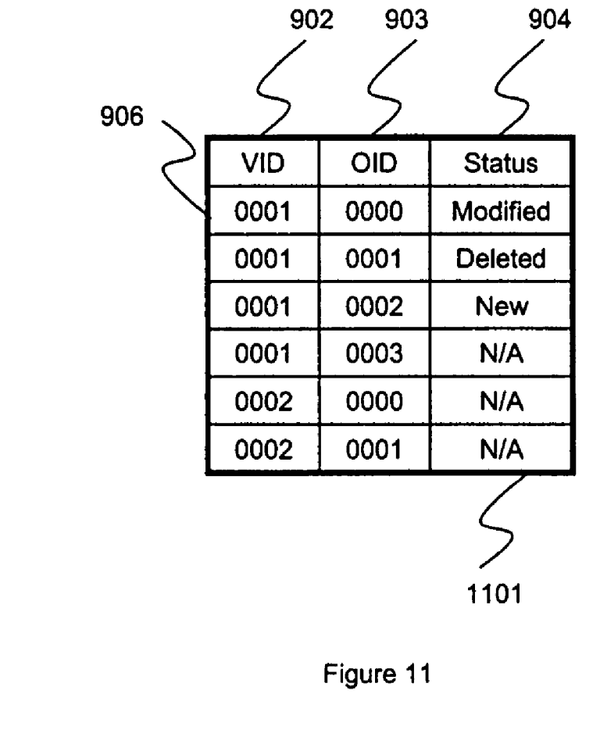
FIG. 11 illustrates a synchronization table.

Another situation which may occur is the data is updated at both the primary and the secondary systems. If this is permitted and the data in the secondary system is synchronized with the data in the primary system after some period of time, the storage controller 704 will maintain a table 1101 such as depicted in FIG. 11. The format of the table 1101 can be the same as that of 901. However, the column 905 is not necessary for the purpose of synchronizing the data in secondary storage system with the data in the primary storage system.

Figure 12:
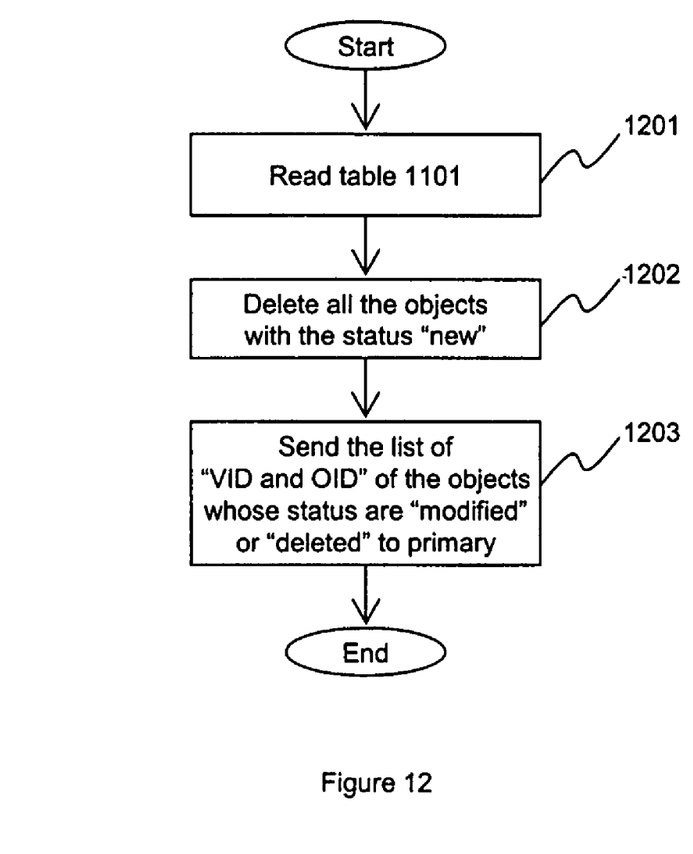
FIG. 12 is a flowchart for a storage controller during resynchronization processing.

FIG. 12 is a flowchart which the storage controller 704 uses at the beginning of the synchronization process. As shown there, at step 1201 the storage controller 704 reads table 1101 and deletes all the objects whose status is new. Entries for those deleted objects are also deleted from the meta-data 705. This is shown by step 1202. Then the storage controller 704 lists the volume IDs and object IDs with the objects having "modified" or "deleted" status. Next the storage controller 704 sends the list to the primary storage system 101. Using a table such as table 901 (FIG. 8) the storage controller 104, which maintains table 901 receives the list from the secondary storage system and sets the status "new" for the objects in the list. Then the data in the primary system is synchronized with the secondary system (updated or new data in the primary system is copied to the secondary storage system). When an object is marked as new or modified, a command to add or update an entry to the meta-data 705 is issued with the information of volume ID and object ID to the secondary storage system. Then the attributes of the object are transferred to the secondary system 113 via commands formatted as depicted in FIG. 9. If an object is marked as deleted, a command to delete the object is transferred to the secondary storage system and the system deletes the entry from the meta-data 705, and may delete the data for that object then, or just mark that portion of the disk available for reuse. Once the synchronization is completed, the entries in table 1101 are reinitialized.

Another potential application for the technology described herein is a circumstance in which the entire data copied to the secondary storage system 113 also needs to be copied to a tertiary storage system. This copy can be done in the same manner as is done between the primary and secondary systems, thereby minimizing the number of data transactions. Alternatively, the meta-data 705 can be force copied to the tertiary storage system, and then the storage controller in the tertiary system reads the appropriate data from the secondary system using the meta-data. This method is particularly advantageous when the secondary system is not an object-based storage system. Of course, as suggested here, the technology described can also be used for any volume to volume copy within a single storage system.

The preceding has been a description of the preferred embodiments of the invention. The scope of the invention can be ascertained from the appended claims.

What is claimed is:

1. In a storage system having a primary system and a secondary system, a method for copying data from the primary system to the secondary system, the method comprising:
   creating a table of meta-data for a plurality of data objects stored on the primary system, the meta-data indicating relationships between the stored data objects and storage locations of the stored data objects at the primary system, including at least volume identification data, object identification data, and address information data of the stored data objects;
   when a request is made to copy one or more stored data objects from the primary system to the secondary system, copying at least some of the meta-data from the primary system to the secondary system, and
   preparing a list of all of the storage locations associated with the stored data objects to be copied;
   sorting the list of storage locations in the order of the address information for the stored data objects to be copied; and
   copying data from the primary system to the secondary system in accordance with the sorted list;
   wherein the stored data objects are stored in blocks at the primary system, and the step of copying data further comprises copying the blocks of the stored data objects to be copied from the primary system to corresponding blocks at the secondary system in the order of the address information in the sorted list of storage locations.

2. A method as in claim 1 wherein the storage locations comprise blocks.

3. A method as in claim 1 wherein the step of creating a table is performed by a storage controller.

4. A method as in claim 1 wherein each block has associated therewith information to provide volume identification, offset address, data length and data.

5. A method as in claim 1 wherein the step of copying data further comprises copying a block at a selected logical block address in the primary system to a logical block address in the secondary system which is different from the logical block address in the primary system.

6. A method as in claim 5 wherein a storage controller determines how to allocate the data to logical blocks.

7. A method as in claim 1 wherein a bitmap is used to synchronize the primary system and the secondary system.

8. A method as in claim 1 wherein a table is used to synchronize the primary system and the secondary system, and the table tracks objects that are changed since the previous synchronization.

9. A method as in claim 1, wherein the step of copying data further comprises copying a block at a selected logical block address in the primary system to that same logical block address in the secondary system.

10. A storage system comprising:
    a primary system for storing data;
    a secondary system for storing a copy of the data in the primary system;
    a table of meta-data associated with the primary system, the meta-data table indicating relationships between primary system data to be copied, comprising a plurality of data objects, and storage locations of the stored data objects;
    a storage controller associated with the primary system for, in response to a request that one or more of the stored data objects be copied to the secondary system, determining storage locations of the stored data objects to be copied and controlling that copy operation to arrange the copying of the stored data objects to be copied in an order based on the storage locations;
    wherein the stored data objects are stored in blocks at the primary system, and the copy operation comprises copying the blocks of the stored data objects to be copied from the primary system to corresponding blocks at the secondary system in the order of the address information in the sorted list of storage locations.

11. A storage system as in claim 10 further comprising a table of meta-data associated with the secondary system.

12. A storage system as in claim 10 wherein each block has associated therewith information to provide volume identification, offset address, data length and data.

13. In a storage system having a primary system and a secondary system, a method for copying data from the primary system to the secondary system comprising:
    creating a table of meta-data for a plurality of data objects stored on the primary system, the meta-data indicating relationships between the stored data objects and storage locations of the stored data objects at the primary system, including at least address information data relating to a storage location where the stored data objects are stored and attribute data relating to at least one attribute of the stored data objects;
    when a request is made to copy one or more stored data objects from the primary system to the secondary system, copying at least some of the meta-data from the primary system to the secondary system, and
    preparing a list of all of the storage locations associated with the stored data objects to be copied;
    sorting the list based on the order of the address information for the stored data objects to be copied; and
    copying data from the primary system to the secondary system in accordance with the sorted list;
    wherein the stored data objects are stored in blocks at the primary system, and the step of copying data further comprises copying the blocks of the stored data objects to be copied from the primary system to corresponding blocks at the secondary system in the order of the address information in the sorted list of storage locations.

14. A method as in claim 13 wherein the primary system and secondary system include data volumes that comprise regions of storage on hard disk drives, and by copying the data in accordance with the sorted list, the data is read faster from the hard disk drives than if it were not sorted.

15. A method as in claim 13 wherein each block has associated therewith information to provide volume identification, offset address, data length and data.

* * * * *